US009440640B1

(12) United States Patent
Pritchard et al.

(10) Patent No.: US 9,440,640 B1
(45) Date of Patent: Sep. 13, 2016

(54) GEAR CHANGE TORQUE FILL STRATEGY

(71) Applicant: BorgWarner Inc., Auburn Hills, MI (US)

(72) Inventors: Larry A. Pritchard, Macomb, MI (US); Thaddeus R. Kopp, Oakland Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/885,588

(22) Filed: Oct. 16, 2015

(51) Int. Cl.
 *B60W 20/00* (2016.01)
 *F16H 59/14* (2006.01)
 *B60K 6/36* (2007.10)
 *B60L 11/00* (2006.01)

(52) U.S. Cl.
 CPC ............... *B60W 20/10* (2013.01); *B60K 6/36* (2013.01); *B60L 11/00* (2013.01); *F16H 59/14* (2013.01); *F16H 2059/147* (2013.01); *Y10S 903/945* (2013.01)

(58) Field of Classification Search
 CPC ...................... Y10T 477/677; Y10S 903/916
 See application file for complete search history.

(56) References Cited

U.S. PATENT DOCUMENTS

| | | | | |
|---|---|---|---|---|
| 6,430,483 B2 * | 8/2002 | Takaoka | ................... | B60K 6/48 180/65.1 |
| 6,502,652 B2 * | 1/2003 | Rogg | ..................... | B60K 6/365 180/65.21 |
| 6,602,164 B2 * | 8/2003 | Yoshiaki | ................... | B60K 6/48 180/65.25 |
| 6,638,195 B2 * | 10/2003 | Williams | ................. | B60K 6/38 180/243 |
| 6,672,050 B2 * | 1/2004 | Murata | ................... | B60K 6/485 180/65.26 |
| 6,741,917 B2 * | 5/2004 | Tomikawa | ............... | B60K 6/52 180/65.225 |
| 6,796,287 B2 * | 9/2004 | Mogi | ..................... | B60K 6/445 123/319 |
| 7,086,989 B2 * | 8/2006 | Siebigteroth | ........ | B16H 61/061 477/109 |
| 7,150,698 B2 * | 12/2006 | Sakamoto | ................ | B60K 6/48 180/65.25 |
| 7,530,413 B2 * | 5/2009 | Rayl | ........................ | B60K 6/48 180/65.25 |
| 7,813,862 B2 * | 10/2010 | Kotani | ................... | B60K 6/365 180/65.21 |
| 7,885,737 B2 * | 2/2011 | Hirata | ....................... | B60K 6/48 180/65.1 |
| 8,150,595 B2 * | 4/2012 | Thompson | ............... | B60K 6/48 180/65.28 |
| 8,808,137 B2 * | 8/2014 | Kaltenbach | ........... | B60W 30/19 477/109 |
| 2013/0118617 A1 | 5/2013 | Long et al. | | |
| 2014/0311248 A1 * | 10/2014 | Mei | ........................... | G01L 9/14 73/722 |
| 2015/0203105 A1 * | 7/2015 | Liang | ...................... | B60L 15/20 701/22 |
| 2015/0353074 A1 * | 12/2015 | Kinoshita | .............. | B60K 6/445 701/22 |

OTHER PUBLICATIONS

U.S. Appl. No. 14/811,880, filed Jul. 29,2015 ;Title: Two Motor e-Assist AWD ; First named inventor: Larry A. Pritchard.
U.S. Appl. No. 14/824,675, filed Aug. 12, 2015 ; Title: E-Assist With Torque Vectoring ; First named inventor: Larry A. Pritchard.
U.S. Appl. No. 14/935,883, filed Nov. 9, 2015; Title: Electric All-Wheel Drive With Two-Speed Double Reduction Planetary; First named inventor: Larry A. Pritchard.
USSN 14/824,595, filed Aug. 12, 2015: Title: Elecrtic Drive System ; First named inventor: Larry A. Pritchard.

* cited by examiner

*Primary Examiner* — Sherry Estremsky
(74) *Attorney, Agent, or Firm* — BrooksGroup

(57) ABSTRACT

A number of variation may include a method that may include providing a drive system that may deliver a torque supply to a vehicle. An electric unit may be provided. The torque supply may be reduced. A torque fill may be initiated when the torque supply is reduced. The torque fill may be supplied from the electric unit.

20 Claims, 3 Drawing Sheets

US 9,440,640 B1

GEAR CHANGE TORQUE FILL STRATEGY

TECHNICAL FIELD

The field to which the disclosure generally relates includes automotive powertrain systems and more particularly, includes powertrain systems with electric drive units.

BACKGROUND

Conventional automotive vehicles known in the art may include a powertrain system in rotational communication with one or more drivelines to propel the vehicle.

SUMMARY OF ILLUSTRATIVE VARIATIONS

A number of illustrative variations may involve a method that may include providing a drive system that may deliver a torque supply to a vehicle. An electric unit may be provided. The torque supply may be reduced. A torque fill may be initiated when the torque supply is reduced. The torque fill may be supplied from the electric unit.

A number of other variations may involve a method and may include providing an axle assembly. A pair of road wheels may be provided and may be driven by the axle assembly. A drive system may be provided. A torque supply may be delivered to the road wheels through the axle assembly. An electric unit may be provided. A torque fill may be initiated when the torque supply is reduced. The torque fill may be supplied from the electric unit.

A number of additional variations may involve a method and may include providing a first axle assembly. A transmission may be connected to the first axle assembly. An engine may be provided supplying a torque to the first axle assembly through the transmission. A first electric unit may be connected with the first axle assembly. A second axle assembly may be provided. A second electric unit may be connected to the second axle assembly. The transmission may be shifted between gears. The torque may be reduced when shifting the transmission. Torque fill may be provided from at least one of the first or second electric units when shifting the transmission.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
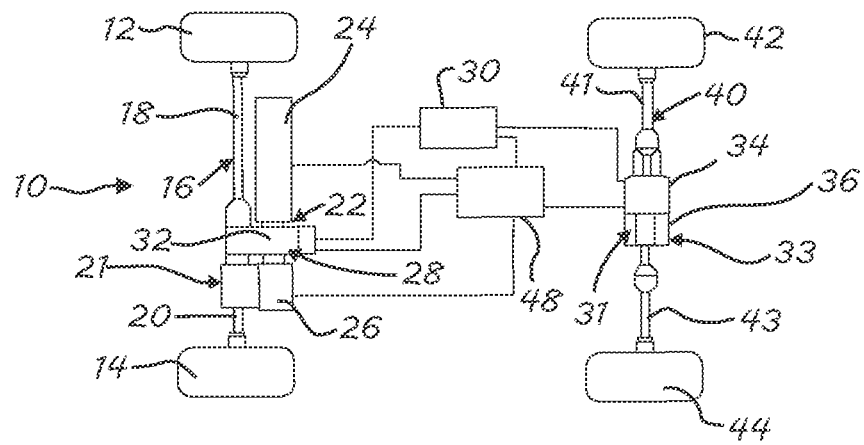
FIG. 1 is a schematic plan view of a vehicle powertrain system including an electric drive unit according to a number of variations.

In a number of variations as illustrated in FIG. 1, a vehicle 10 may include a first pair of wheels 12 and 14 which may be connected to an axle assembly 16. The axle assembly 16 may be the front axle of a multi-axle vehicle, or may be another axle. The wheels 12 and 14 may be referred to as road wheels in that they may contact the surface upon which the vehicle 10 may operate, and may provide rolling support to assist with movement of the vehicle 10 relative to the surface. The axle assembly 16 may include a first axle shaft 18 connected to the wheel 12 and a second axle shaft 20 connected to the wheel 14. The associated vehicle 10 may include any number of drivelines with any suitable number of wheels in other variations.

In a number of variations the axle shafts 18 and 20 of the axle assembly 16 may be operatively connected with a drive system 21 that may include a powertrain system 22. The powertrain system 22 may be operated to supply torque, which may be used to drive the wheels 12 and 14. The powertrain system 22 may be realized as a number of power plant options and as an example may include a convention internal combustion engine 24 that may be in rotational communication with a transmission 26. The transmission 26 may be an automatic, automated manual, dual clutch, or another type. The engine 24 may generate rotational torque which may be translated to the transmission 26 which, in turn, may translate rotational torque to the pair of road wheels 12 and 14. The transmission 26 may transfer the rotational speed and torque generated by the engine 24 at various gear ratios and may translate rotation to the road wheels 12 and 14 to so as to drive the vehicle in operation. The engine 24 and the transmission 26 of the powertrain system 22 may be of the type employed in conventional transverse front wheel drive powertrain systems. In other variations the engine 24 and/or the transmission 26 may be of any suitable type, configured in any suitable way sufficient to generate and translate rotational torque to the wheels 12 and 14. In a number of variations the powertrain system 22 may be configured differently, or even omitted entirely. In a number of variations the powertrain system 22 may employ a hybrid approach whereby rotational torque translated to the wheels 12 and 14 may be generated by the engine 24 as well as by one or more electric units 28.

In a number of variations the electric unit 28 may be an integrated system for electrical generation and boosting wherein the electric unit 28 may be connected with the axle assembly 16, through the transmission 26, or directly. The electric unit 28 may be rotated by the axle assembly 16, such as during a regenerative braking event, to generated electricity, and as such may act as a generator. The electric unit 28 may be powered by an electric source such as a battery 30 to supply torque to the axle assembly 16. In supplying torque, the electric unit 28 may assist the engine 24 in driving the wheels 12 and 14, or may operate to drive the wheels 12 and 14 without the engine 24 such as during a vehicle launch event. In a number of variations the electric unit 28 may be as described in U.S. patent application Ser. No. 14/811,880 titled Two Motor e-Assist AWD, filed Jul. 29, 2015, which is commonly assigned and which is specifically incorporated herein by reference. In a number of variations the electric unit 28 may be of another suitable type. The electric unit 28 may include an electric machine 32 which may be a motor or may be a motor-generator, or may be another type of electric machine to power the electric unit 28, and if desired to provide charging.

In a number of variations the vehicle 10 may include a drive unit 31 that may include an auxiliary powertrain system 33. The auxiliary powertrain system 33 may be associated with an axle assembly 40. As illustrated in FIG. 1, the axle assembly 40 may include an electric unit 34. The electric unit 34 may be connected with a pair of road wheels 42 and 44. The axle assembly 40 may be the rear axle of a multi-axle vehicle, or may be another axle. The axle assembly 40 may include a first axle shaft 41 connected to the wheel 42 and a second axle shaft 43 connected to the wheel 44. Each of the axle shafts 41 and 43 may be connected to the electric unit 34. In a number of variations the electric unit 34 may be used in connection with any suitable type of vehicle powertrain system, with or without the use of a conventional internal combustion engine 24. The electric unit 34 may be rotated by the axle assembly 40, such as during a regenerative braking event, to generated electricity, and as such may act as a generator. The electric unit 34 may be powered by an electric source such as a battery 30 to supply torque to the axle assembly 40. In supplying torque, the electric unit 34 may assist the powertrain system 22 in propelling the vehicle or may operate separately. In a number of variations the electric unit 34 may be as described in U.S. patent application Ser. No. 14/824,675 titled E-Assist With Torque Vectoring, filed Aug. 12, 2015 which is commonly assigned and which is specifically incorporated herein by reference. In other variations another type of electric unit may be used. The electric unit 34 may include an electric machine 36 which may be a motor or may be a motor-generator, or may be another type of electric machine to power the electric unit 28 and if desired, to provide battery charging.

In a number of variations both the powertrain system 22 and the auxiliary powertrain system 33 may be realized as independent electric drive units. In a number of variations the powertrain systems 22 and 33 may be adapted for use with automotive passenger vehicles or with any suitable type of vehicle, such as heavy-duty trucks, trains, airplanes, ships, construction vehicles or equipment, military vehicles, recreational vehicles, or any other type of vehicle that may benefit from electrically-powered torque generation. In a number of variations the electric machines 32 and 36 may be of any suitable type or configuration sufficient to generate rotational torque using power from the battery 30. In a number of variations the powertrain system 22 may act to generate and translate rotational torque only to the first pair of road wheels 12 and 14 of the axle assembly 16. Similarly, in a number of variations the auxiliary powertrain system 33 may act to deliver rotational torque only to the second pair of road wheels 42 and 44 of the axle assembly 40.

In a number of variations the vehicle 10 may include a controller 48 that may be a number of controllers and that may be connected with each of the engine 24, the electric unit 28, the transmission 26, the battery 30 and the electric unit 34. Methods, algorithms, or parts thereof may be implemented in a computer program product of the controller 48 including instructions or calculations carried on a computer readable medium for use by one or more processors to implement one or more of the method steps or instructions. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

In a number of variations, the program(s) may be embodied on computer readable media, which can include one or more storage devices, articles of manufacture, or the like. Illustrative computer readable media may include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data may be transferred or provided over a network or another communications connection (either wired, wireless, or a combination thereof). Any combination(s) of the above examples is also included within the scope of the computer-readable media. It is therefore to be understood that methods may be at least partially performed by any electronic articles and/or devices capable of executing instructions corresponding to one or more steps of the disclosed methods. In a number of variations the controller 38 may produce signals that may be delivered the engine 24 and may set the operational state and/or speed thereof. The controller 38 may produce signals to set the operational state of each of the transmission 26, electric unit 28 and electric unit 34.

Figure 2:
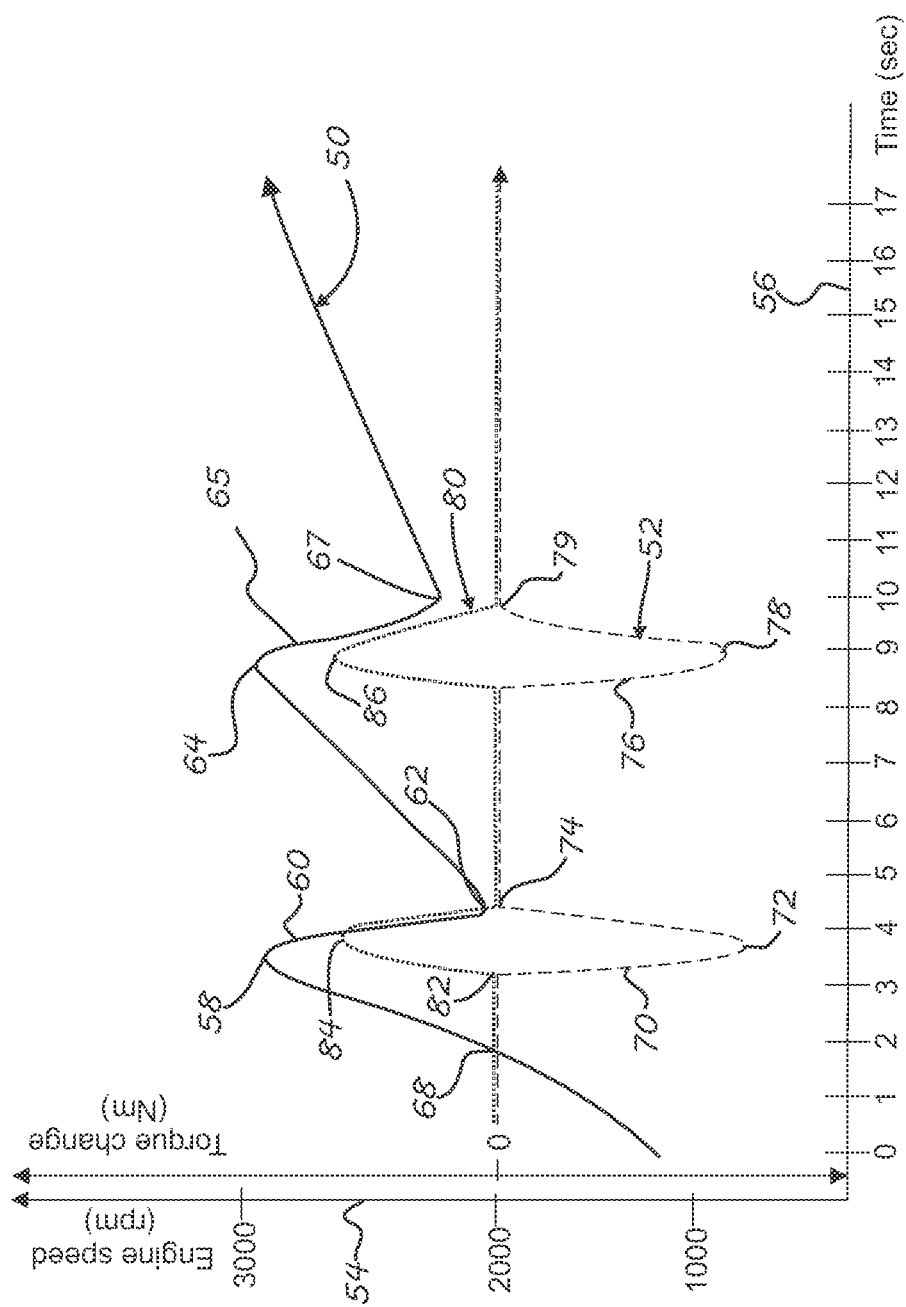
FIG. 2 is a graph of engine speed versus time along with an overlay of torque reduction and torque fill versus time for part of a vehicle acceleration sequence according to a number of variations.

In a number of variations operation of the vehicle 10 with propulsion supplied by the engine 24 through the transmission 26 may be described with reference to FIG. 2, and specifically to curves 50 and 52 thereof. With reference to curve 50, FIG. 2 charts revolutions per minute (RPMs) of the engine 24 on the vertical axis 54 versus time from launch in seconds on the horizontal axis 56. Curve 50 begins with idle speed at zero time and rises following launch of the vehicle 10 moving away from zero time in first gear of the transmission 26 with a localized peak at point 58. At point 58 a gear upshift from first gear to second gear of the transmission 26 may be initiated. In coordination with the upshift, the speed of the engine 24 may be reduced as illustrated by curve segment 60 which has a downward slope from point 58. This drop in speed may be initiated via an engine 24 torque reduction request from the controller 48 which results in the speed reduction charted by curve segment 60. When the transmission 26 has completed the shift from first to second gear the curve 50 may turn upward from point 62 as speed of the engine 24 increases with the transmission 26 in second gear. The curve 50 may experience another localized peak at point 64 where a gear upshift from second gear to third gear of the transmission 26 may be initiated. In coordination with the upshift, the speed of the engine 24 may be reduced as illustrated by curve segment 65 which has a downward slope from point 64. This may be initiated via an engine 24 torque reduction request from the controller 48 which results in the speed reduction charted by curve segment 65. When the transmission 26 has completed the shift from second to third gear the curve 50 may turn upward from point 67 as speed of the engine 24 increases with the transmission 26 in third gear. For illustration purposes, only two gear shift events are shown, it being understood that operation of the engine 24 may proceed through higher speed gear upshifts, or may slow and may require downshifts depending on the driving environment.

With reference to curve 52, in a number of variations torque output from the engine 24 is shown graphed in Newton-meters on the vertical axis versus time in seconds on the horizontal axis. Torque may be represented by a baseline value at 68 representative of the baseline torque delivered by the engine 24 as needed to propel the vehicle 10. Actual torque values may vary during acceleration but for simplicity the baseline representation is shown as a consistent value. The vertical axis represents changes in torque from the baseline represented as zero change. Corresponding in time with point 58 of the curve 50, a torque reduction request from the controller 48 to the engine 24 may also result in a drop in torque as illustrated by segment 70 of the curve 52. As the gear upshift from first gear to second gear is carried out, the torque reduction request may be ended at point 72 and torque may return to the baseline at point 74 and may continue as the engine speed increases. Corresponding in time with point 64 of the curve 50, a torque reduction request from the controller 48 to the engine 24 may also result in a drop in torque as illustrated by segment 76 of the curve 52. As the gear upshift from first gear to second gear is carried out, the torque reduction request may be ended at point 78 and torque may return to the baseline at point 79 and may continue as the engine speed increases.

In a number of variations the electric unit 28 may be operated by the controller 48 in coordination with requests for torque reduction from the engine 24. As illustrated by curve 80, torque supplied by the electric unit 28 may be zero until a point in time corresponding with point 58 on curve 50 and indicated by reference numeral 82. The controller 48 may operate the electric unit 28 to supply torque to the axle assembly 16 to offset the torque reduction incurred due to the torque reduction from the engine 24 during the upshift from first to second gear. A torque peak 84 supplied by the electric unit 28 corresponds with the point 72 of curve 52. Torque supplied by the electric unit 28 may be reduced from point 84 and may return to zero at a point in time corresponding with point 62 of curve 50 when torque supplied by the engine 24 has returned to baseline. Torque supplied by the electric unit 28 may remain at zero until another upshift event may occur such as at point 64 of curve 50. The controller 48 may operate the electric unit 28 to supply torque to the axle assembly 16 to offset the torque reduction incurred due to the torque reduction from the engine 24 during the upshift from second to third gear. A torque peak 86 supplied by the electric unit 28 corresponds with the point 78 of curve 52. Torque supplied by the electric unit 28 may be reduced from point 86 and may return to zero at a point in time corresponding with point 67 of curve 50 when torque supplied by the engine 24 has returned to baseline. The torque supplied by the electric unit 28 may be said to fill the torque reduction from the engine 24 that is incurred to facilitate shifting of the transmission 26. In a number of variations the electric unit 34 may be operated to participate in torque fill along with, or in place of the electric unit 28. For example, if an ongoing operational event of the vehicle 10 has initiated operation of the electric unit 34 prior to initiation of a torque reduction of the engine 24, the electric unit 34 may supply the fill torque. In other examples, if the torque reduction from the engine 24 is greater than the torque that can be supplied by the electric unit 28, the electric unit 34 may be operated to provide supplement torque. In a number of variations the electric unit 28 may provide torque fill for mode changes in the auxiliary powertrain system 33. For example, when the electric unit 34 is operated by the controller 48 in an e-assist mode, the electric unit 28 may be operated during torque dips, such as may occur when the auxiliary powertrain system 33 shifts between high and low modes.

Figure 3:
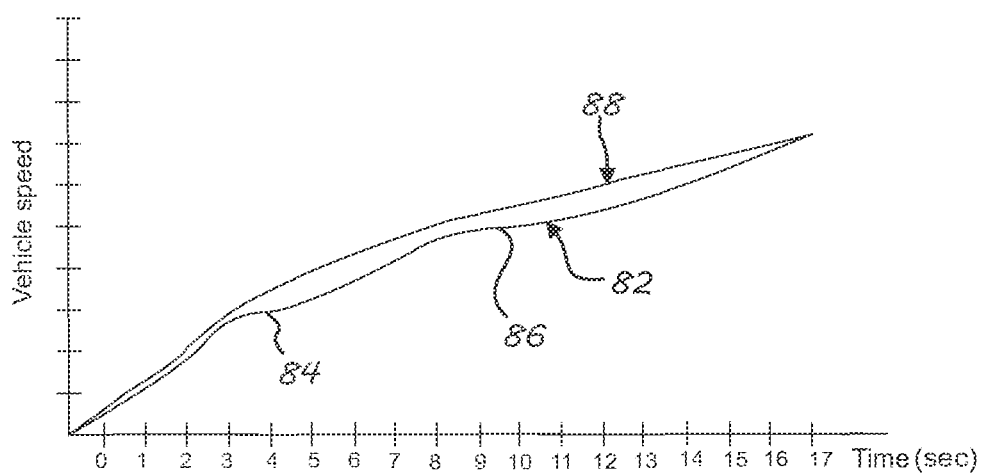
FIG. 3 is a graph of vehicle speed versus time according to a number of variations.

In a number of variations as illustrated in FIG. 3, the speed of the vehicle 10 may be represented in such as, miles per hour on the vertical axis versus time in seconds on the horizontal axis. Curve 82 may represent speed of the vehicle 10 with torque supplied solely from the engine 24, without the use of torque fill from the electric units 28, 34. The speed may increase during acceleration of the vehicle 10 from time zero onward, with the exception of speed dips at points 84 and 86. The speed dip 84 may correspond with a shift of the transmission 26 from first to second gear. Similarly, the speed dip 86 may correspond with a shift of the transmission 26 from second to third gear. In a number of variations the curve 88 may represent speed of the vehicle 10 with torque supplied from the engine 24, and with the use of torque fill from the electric units 28 and/or 34. The speed may continually increase without perceptible speed dips, including during shifts of the transmission 26. In addition, with torque fill, vehicle performance may be improved and perceptible drops in acceleration may be minimized or eliminated.

Figure 4:
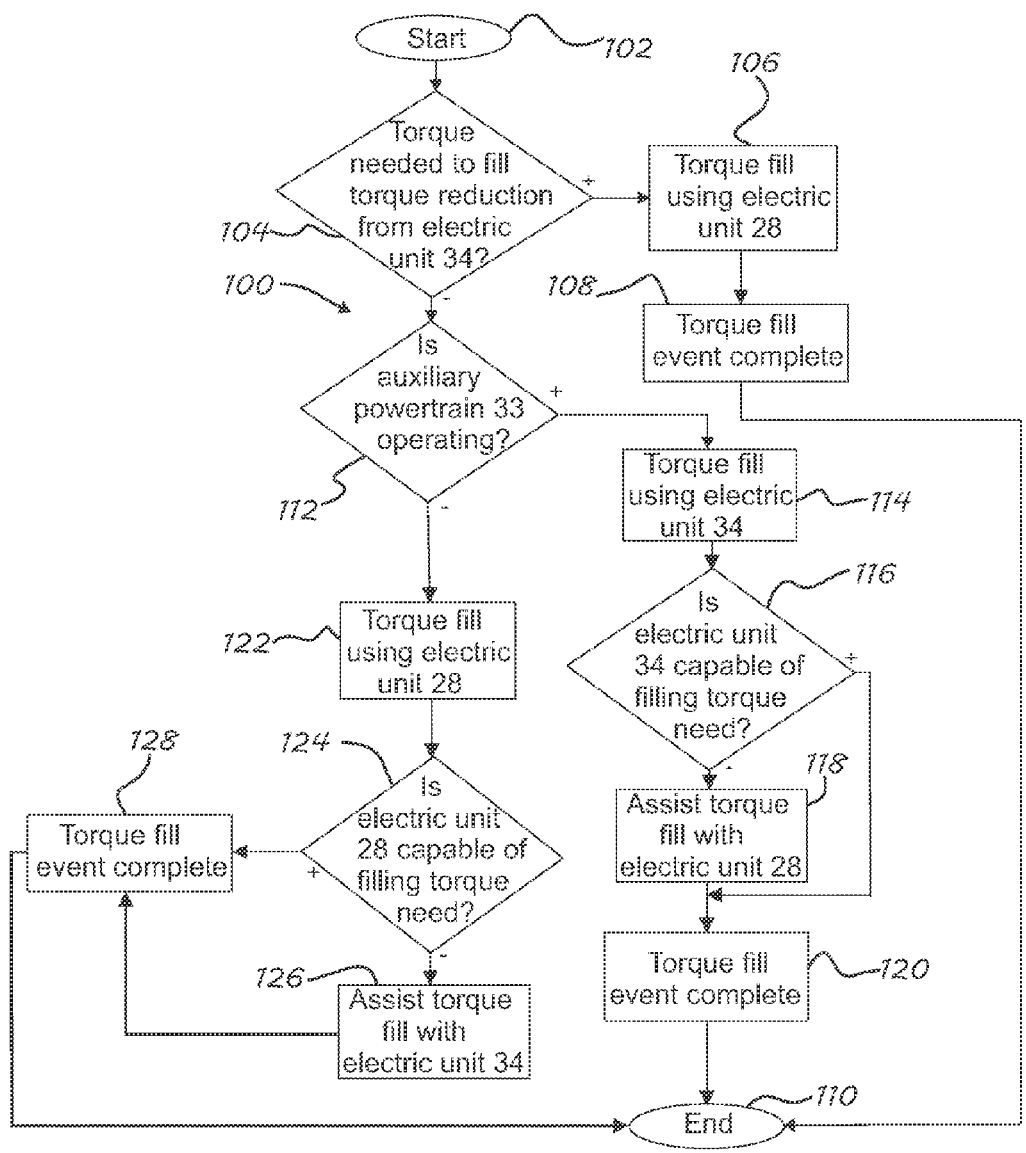
FIG. 4 is a diagram of a method for torque fill according to a number of variations.

In a number of variations as illustrated in FIG. 4, a method 100 may be carried out in the controller 48 and may be initiated at step 102 when a torque fill event is incipient or initiated, such as a deliberate torque reduction in the engine 24 or in the electric unit 34. The method 100 may proceed to step 104 where a determination may be made of whether the torque fill need is to offset a torque reduction in the electric unit 34. If the determination is positive, the method 100 may proceed to step 106 where electric unit 28 may be operated to supply torque to offset the torque reduction incurred by electric unit 34. The method 100 may proceed to step 108 and when the torque fill event is complete the method 100 may end at step 110.

Returning to step 104, if the determination is negative, meaning torque fill may be needed to offset a torque reduction from the engine 24, the method 100 may proceed to step 112. At step 112 a determination may be made as to whether the auxiliary powertrain 33 is operating. For example, the auxiliary powertrain 33 may be operating to affect dynamics of the vehicle 10, to provide propulsion at the wheels 42, 44, or for other uses. If the auxiliary powertrain 33 is operating, the method 100 may proceed to step 114 where the torque supplied by electric unit 34 may be increased to supply the torque fill need. The method 100 may proceed to step 116 where a determination may be made as to whether the electric unit 34 is capable of supplying enough torque to fill the torque need. For example, the torque reduction may be compared to the current torque output of the electric unit 34 and its rated maximum torque output. If the determination is negative, the method 100 may proceed to step 118 where the electric unit 28 may be operated to supplement the torque supplied by the electric unit 34 in filling the torque need. If the determination at step 116 is positive, the method 100 may proceed to step 120. Also, from step 118 the method 100 may proceed to step 120. At step 120, once the torque fill event is complete the method 100 may end at step 110.

Returning to step 112, if the determination is negative and the auxiliary powertrain is not operating, the method 100 may proceed to step 122 where the electric unit 28 may be operated to supply the torque fill need. The method 100 may proceed to step 124 where a determination may be made as to whether the electric unit 28 is capable of supplying enough torque to fill the torque need. If the determination is negative, the method 100 may proceed to step 126 where the electric unit 34 may be operated to supplement the torque supplied by the electric unit 28 in filling the torque need. If the determination at step 124 is positive, the method 100 may proceed to step 128. Also, from step 126 the method 100 may proceed to step 128. At step 128, once the torque fill event is complete the method 100 may end at step 110.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a method that may include providing a drive system that may deliver a torque supply to a vehicle. An electric unit may be provided. The torque supply may be reduced. A torque fill may be initiated when the torque supply is reduced. The torque fill may be supplied from the electric unit.

Variation 2 may include a method according to variation 1 and may include providing a transmission through which the drive system may deliver the torque supply to the vehicle. A gear shift of the transmission may be initiated when the torque supply is reduced.

Variation 3 may include a method according to variation 1 and may include providing a second electric unit. A mode shift may be initiated in the second electric unit when the torque supply is reduced.

Variation 4 may include a method according to variation 1 and may include providing a second electric unit. Whether the second electric unit is operating may be determined when the torque supply is reduced. The torque fill may be provided from the second electric unit.

Variation 5 may include a method according to variation 1 and may include providing a second electric unit. Whether the electric unit is capable of supplying the torque fill may be determined. When the electric unit is not capable of supplying the torque fill, the torque fill may be supplemented from the second electric unit.

Variation 6 may include a method according to variation 1 and may include providing a second electric unit. Whether the second electric unit is operating may be determined when the torque supply is reduced. The torque fill may be supplied from the second electric unit. Whether the second electric unit is capable of supplying the torque fill may be determined. When the second electric unit is not capable of supplying the torque fill, the torque fill may be supplemented from the electric unit.

Variation 7 may include a method according to variation 1 and may include providing a powertrain system. An engine may be provided in the powertrain system. A transmission may be provided in the powertrain system through which the engine may deliver the torque supply to the vehicle. The electric unit may be connected with the transmission.

Variation 8 may include a method according to variation 7 and may include providing an auxiliary powertrain system. A second electric unit may be provided in the auxiliary powertrain system. The torque fill may be supplied from at least one of the electric unit or the second electric unit.

Variation 9 may involve a method and may include providing an axle assembly. A pair of road wheels may be provided and may be driven by the axle assembly. A drive system may be provided. A torque supply may be delivered to the road wheels through the axle assembly. An electric unit may be provided. A torque fill may be initiated when the torque supply is reduced. The torque fill may be supplied from the electric unit.

Variation 10 may include a method according to variation 9 and may include providing a transmission through which the drive system may deliver the torque supply to the vehicle. A gear shift of the transmission may be initiated when the torque supply is reduced.

Variation 11 may include a method according to variation 9 and may include providing a second electric unit. A mode shift may be initiated in the second electric unit when the torque supply is reduced.

Variation 12 may include a method according to variation 9 and may include providing a second electric unit. Whether the electric unit is capable of supplying the torque fill may be determined. When the electric unit is not capable of supplying the torque fill, the torque fill may be supplemented from the second electric unit.

Variation 13 may include a method according to variation 9 and may include providing a powertrain system. An engine may be provided in the powertrain system. A transmission may be provided in the powertrain system through which the engine may deliver the torque supply to the vehicle. The electric unit may be connected with the transmission.

Variation 14 may include a method according to variation 13 and may include providing an auxiliary powertrain system. A second electric unit may be provided in the auxiliary powertrain system. The torque fill may be provided from at least one of the electric unit or the second electric unit.

Variation 15 may involve a method and may include providing a first axle assembly. A transmission may be connected to the first axle assembly. An engine may be provided supplying a torque to the first axle assembly through the transmission. A first electric unit may be connected with the first axle assembly. A second axle assembly may be provided. A second electric unit may be connected to the second axle assembly. The transmission may be shifted between gears. The torque may be reduced when shifting the transmission. Torque fill may be provided from at least one of the first or second electric units when shifting the transmission.

What is claimed is:

1. A method comprising providing a drive system delivering a torque supply to a vehicle, providing an electric unit, reducing the torque supply, initiating a torque fill when the torque supply is reduced, and supplying the torque fill from the electric unit, providing a second electric unit, determining whether the second electric unit is operating when the torque supply is reduced, and supplying the torque fill from the second electric unit.

2. The method according to claim 1 further comprising providing a transmission through which the drive system delivers the torque supply to the vehicle, and initiating a gear shift of the transmission when the torque supply is reduced.

3. The method according to claim 1 further comprising initiating a mode shift in the second electric unit when the torque supply is reduced.

4. The method according to claim 1 further comprising initiating a mode shift in the second electric unit between a high mode and a low mode, and providing the torque fill from the electric unit during the mode shift.

5. The method according to claim 1 further comprising determining whether the electric unit is capable of supplying the torque fill, and when the electric unit is not capable of supplying the torque fill, supplementing the torque fill from the second electric unit.

6. The method according to claim 1 further comprising providing a powertrain system, providing an engine in the powertrain system, providing a transmission in the powertrain system through which the engine delivers the torque supply to the vehicle, and connecting the electric unit with the transmission.

7. The method according to claim 6 further comprising providing an auxiliary powertrain system, and providing the second electric unit in the auxiliary powertrain system.

8. A method comprising providing a drive system delivering a torque supply to a vehicle, providing an electric unit, reducing the torque supply, initiating a torque fill when the torque supply is reduced, and supplying the torque fill from the electric unit, providing a second electric unit, determining whether the second electric unit is operating when the torque supply is reduced, supplying the torque fill from the second electric unit, determining whether the second electric unit is capable of supplying the torque fill, and when the second electric unit is not capable of supplying the torque fill, supplementing the torque fill from the electric unit.

9. A method comprising providing an axle assembly, providing a pair of road wheels driven by the axle assembly, providing a drive system delivering a torque supply to the road wheels through the axle assembly, providing an electric unit, initiating a torque fill when the torque supply is reduced, and supplying the torque fill from the electric unit, providing a second electric unit, determining whether the electric unit is capable of supplying the torque fill, and when the electric unit is not capable of supplying the torque fill, supplementing the torque fill from the second electric unit.

10. The method according to claim 9 further comprising providing a transmission through which the drive system delivers the torque supply to the vehicle, and initiating a gear shift of the transmission when the torque supply is reduced.

11. The method according to claim 9 further comprising initiating a mode shift in the second electric unit when the torque supply is reduced.

12. The method according to claim 9 further comprising initiating a mode shift in the second electric unit between a high mode and a low mode, and providing the torque fill from the electric unit during the mode shift.

13. The method according to claim 9 further comprising providing a powertrain system, providing an engine in the powertrain system, providing a transmission in the powertrain system through which the engine delivers the torque supply to the vehicle, and connecting the electric unit with the transmission.

14. The method according to claim 13 further comprising providing an auxiliary powertrain system, and providing the second electric unit in the auxiliary powertrain system.

15. A method comprising providing a first axle assembly, connecting a transmission to the first axle assembly, providing an engine supplying a torque to the first axle assembly through the transmission, connecting a first electric unit with the first axle assembly, providing a second axle assembly, connecting a second electric unit to the second axle assembly, shifting the second axle assembly between a high mode and a low mode, and providing a torque fill from at least one of the first or second electric units when shifting the second axle assembly between the high mode and the low mode.

16. The method according to claim 15 comprising shifting the transmission between gears, reducing the torque when shifting the transmission, and providing the torque fill when shifting the transmission.

17. A method comprising providing an axle assembly, providing a pair of road wheels driven by the axle assembly, providing an engine to deliver a first torque supply to the road wheels through the axle assembly, providing an electric unit to deliver a second torque supply, determining whether a reduction in the first torque supply is incipient or initiated, determining whether a torque reduction in the second torque supply is incipient or initiated, and initiating a torque fill when either the first or second torque supply is reduced, and supplying the torque fill from the electric unit.

18. The method according to claim 17 comprising providing a second axle assembly, and delivering the second torque supply to the second axle assembly.

19. The method according to claim 17 comprising providing a second axle assembly, providing a second electric unit, and delivering the second torque supply to the second axle assembly from the second electric unit.

20. The method according to claim 17 comprising providing a second axle assembly, providing a second electric unit, delivering the second torque supply to the second axle assembly from the second electric unit, and providing the torque fill from both the first and second electric units.

\* \* \* \* \*